United States Patent
Chiao et al.

[19]

[11] Patent Number: 6,074,348
[45] Date of Patent: *Jun. 13, 2000

[54] METHOD AND APPARATUS FOR ENHANCED FLOW IMAGING IN B-MODE ULTRASOUND

[75] Inventors: Richard Yung Chiao, Clifton Park, N.Y.; Anne Lindsay Hall, New Berlin, Wis.; Kai Erik Thomenius, Clifton Park, N.Y.; Michael Joseph Washburn, New Berlin, Wis.; Kenneth Wayne Rigby, Clifton Park, N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/065,212

[22] Filed: Apr. 23, 1998

Related U.S. Application Data

[63] Continuation-in-part of application No. 09/052,789, Mar. 31, 1998, abandoned.

[51] Int. Cl.$^7$ ........................................................ A61B 8/00
[52] U.S. Cl. ........................... 600/443; 600/447; 600/441
[58] Field of Search .................................. 600/437, 441, 600/443, 454, 458, 440, 459

[56] References Cited

U.S. PATENT DOCUMENTS

| | | | |
|---|---|---|---|
| 4,276,885 | 7/1981 | Tickner et al. | 128/660 |
| 5,456,257 | 10/1995 | Johnson et al. | 600/458 |
| 5,706,819 | 1/1998 | Hwang et al. | 600/458 |
| 5,724,976 | 3/1998 | Mine et al. | 600/459 |

FOREIGN PATENT DOCUMENTS 0770352  2/1997  European Pat. Off. .......... A61B 8/00

OTHER PUBLICATIONS

Torp et al., "Comparison Between Cross–Correlation and Auto–Correlation Technique in Color Flow Imaging," Proc. 1993 IEEE Untrason. Symp., pp. 1039–1042.
Thomas et al., "An Improved Wall Filter for Flow Imaging of Low Velocity Flow," Proc. 1994 IEEE Ultrason. Symp., pp. 1701–1704.
Ishihara et al., "Path Lines in Blood Flow Using High Speed Digital Subtraction Echography," Proc. 1992 IEEE Ultrason. Symp., pp. 1277–1280.

(List continued on next page.)

*Primary Examiner*—William E. Kamm
*Assistant Examiner*—Ali M. Imam
*Attorney, Agent, or Firm*—Marvin Snyder; Douglas E. Stoner

[57] ABSTRACT

A method and apparatus for ultrasonically imaging flow directly in B mode employs a sequence of pulses transmitted to a transmit focal position, with the backscattered signals from this sequence being filtered to remove echoes from stationary or slow-moving reflectors along the transmit path. The resulting flow signals are superimposed on a conventional B-mode vector and displayed. A B-mode flow image is formed by repeating this procedure for multiple transmit focal positions across the region of interest. The filtering is performed in slow time (along transmit firings) using a high-pass "wall" filter (e.g., an FIR filter) with harmonic image feed-through and optionally B-mode (fundamental) feed-through. The resulting B-mode flow image has low clutter from stationary or slow-moving tissue or vessel walls, high resolution, high frame rate and flow sensitivity in all directions.

23 Claims, 8 Drawing Sheets

OTHER PUBLICATIONS

Ishihara et al., "High–Speed Digital Subtraction Echography: etc.," Proc. 1990 IEEE Ultrason. Symp., pp. 1473–1476.

de Jong et al., "Principles and Recent Developments in Ultrasound Contrast Agents," Ultrasonics, vol. 29, pp. 324–330 (1991).

Newhouse et al., "Second Harmonic Doppler Ultrasound Blood Perfusion Measurement," Proc. 1992 IEEE Ultrason. Symp., pp. 1175–1177.

Burns et al., "Harmonic Power Mode Doppler Using Microbubble Contrast Agents: etc.," Proc. 1994 IEEE Ultrason. Symp., pp. 1547–1550.

Averkiou et al., "A New Imaging Technique Based on the Nonlinear Properties of Tissue," Proc. 1997 IEEE Ultrason. Symp.

Uhlendorf, "Physics of Ultrasound Contrast Imaging: etc.," IEEE Trans. Ultrason. Feroelec. & Freq. Control, vol. 41, No. 1, pp. 70–79, Jan. (1994).

Shahnazi et al., "Use of Contrast Agents in Ultrasound," Proc. 1994 IEEE Ultrason. Symp., pp. 85–87.

Wang et al., "Contrast Medium Assisted Fluid Flow Measurements," IEEE Trans. Ultrason. Ferroelec. & Freq. Control, vol. 42, No. 2, pp. 309–315, Mar. (1995).

fig. 1 fig. 2 fig. 3 fig. 4 fig. 5 fig. 6 fig. 7 fig. 8

METHOD AND APPARATUS FOR ENHANCED FLOW IMAGING IN B-MODE ULTRASOUND

CROSS REFERENCE TO RELATED APPLICATION

This is a Continuation-In-Part of application Ser. No. 09/052,789, filed Mar. 31, 1998, now abandoned.

FIELD OF THE INVENTION

This invention generally relates to ultrasound imaging of the human anatomy for the purpose of medical diagnosis. In particular, the invention relates to methods and apparatus for imaging moving fluid or tissue (with or without contrast agents) in the human body by transmitting ultrasound waves into the moving fluid or tissue and then detecting ultrasound echoes reflected therefrom.

BACKGROUND OF THE INVENTION

Conventional ultrasound scanners create two-dimensional B-mode images of tissue in which the brightness of a pixel is based on the intensity of the echo return. In a so-called "color flow" mode, the flow of blood or movement of tissue can be imaged. Conventional ultrasound flow imaging methods use either the Doppler principle or a time-domain cross-correlation method to estimate the average flow velocity, which is then displayed in color overlaid on a B-mode image.

Measurement of blood flow in the heart and vessels using the Doppler effect is well known. The frequency shift of backscattered ultrasound waves may be used to measure the velocity of the back-scatterers from tissue or blood. The change or shift in backscattered frequency increases when blood flows toward the transducer and decreases when blood flows away from the transducer. The Doppler shift may be processed to estimate the average flow velocity, which is displayed using different colors to represent speed and direction of flow. The color flow velocity mode displays hundreds of adjacent sample volumes simultaneously, all color-coded to represent each sample volume's velocity.

In accordance with a known imaging system, the color flow mode employs multiple transmit firings for each focal point. Operating on a packet of as many as 16 transmits, a high-pass wall filter rejects echoes from slow-moving tissue or vessel walls to reduce the signal dynamic range for subsequent flow processing, using the Kasai autocorrelation algorithm or a cross-correlation algorithm to estimate the average flow velocity.

Although quantitative velocity information may be obtained in conventional color-flow imaging, the ability to see physical flow is limited by its clutter rejection capability, resolution, frame rate, and axial-only flow sensitivity.

Digital subtraction methods have been previously proposed to image moving reflectors in B-mode imaging (see Ishihara et al., "Path Lines in Blood Flow Using High-Speed Digital Subtraction Echography," Proc. 1992 IEEE Ultrason. Symp., pp. 1277–1280, and Ishihara et al., "High-Speed Digital Subtraction Echography: Principle and Preliminary Application to Arteriosclerosis, Arrhythmia and Blood Flow Visualization," Proc. 1990 IEEE Ultrason. Symp., pp. 1473–1476). However, these methods use frame-to-frame subtraction, which is essentially a two-tap wall filter with an extremely low cut-off frequency. The low cutoff frequency is due to the long time delay between adjacent frames, which does not adequately suppress signals from slow-moving tissue or vessel walls.

U.S. Pat. No. 5,632,277 to Chapman et al. discloses a nonlinear imaging system using phase inversion subtraction. The Chapman patent uses "first and second ultrasound pulses that are alternatively transmitted into the specimen being imaged," and mentions the particular embodiment of transmitting and summing on receive two pulses that differ by 180 degrees.

Conventional ultrasound images are formed from a combination of fundamental and harmonic signal components, the latter of which are generated in a nonlinear medium such as tissue or a blood stream containing contrast agents. In certain instances ultrasound images may be improved by suppressing the fundamental and emphasizing the harmonic signal components.

Contrast agents have been developed for medical ultrasound to aid in diagnosis of traditionally difficult-to-image vascular anatomy. For example, the use of contrast agents is discussed by de Jong et al. in "Principles and Recent Developments in Ultrasound Contrast Agents," Ultrasonics, Vol. 29, pp. 324–380 (1991). The agents, which are typically microbubbles whose diameter is in the range of 1–10 micrometers, are injected into the blood stream. Since the backscatter signal of the microbubbles is much larger than that of blood cells, the microbubbles are used as markers to allow imaging of blood flow. One method to further isolate echoes from these agents is to use the (sub)-harmonic components of the contrast echo, which are much larger than the harmonic components of the surrounding tissue without contrast agent. [See, e.g., Newhouse et al., "Second Harmonic Doppler Ultrasound Blood Perfusion Measurement," Proc. 1992 IEEE Ultrason. Symp., pp. 1175–1177; and Burns, et al., "Harmonic Power Mode Doppler Using Microbubble Contrast Agents: An Improved Method for Small Vessel Flow Imaging," Proc. 1994 IEEE Ultrason. Symp., pp. 1547–1550.] Flow imaging of (sub)harmonic signals has largely been performed by transmitting a narrowband signal at frequency $f_0$ and receiving at a band centered at frequency $2f_0$ (second harmonic) or at frequency $f_0/2$ (subharmonic) followed by conventional color flow processing. This approach has all the limitations of a conventional color flow system, namely, low resolution, low frame rate and flow sensitivity only in the axial direction.

Thus, there is a need for a method of visualizing physical flow in B mode by directly imaging moving reflectors. This requires the imaging system to have high dynamic range, the ability to reject clutter from stationary or slow moving tissue and vessel walls, high resolution, high frame rate, and flow sensitivity in all directions.

SUMMARY OF THE INVENTION

A method and apparatus for imaging flow directly in B mode employs a sequence of broadband pulses transmitted to a transmit focal position, and the backscattered signals from this sequence are filtered to remove echoes from stationary or slow-moving reflectors along the transmit path. The resulting flow signals are superimposed on a conventional B-mode vector and displayed. A B-mode flow image is formed by repeating the above procedure for multiple transmit focal positions across the region of interest. The filtering is performed in slow time (along transmit firings) and consists of a high-pass "wall" filter (e.g., an FIR filter) with B-mode image feed-through. The firing-to-firing filtering permits a longer FIR wall filter for better clutter suppression while increasing the cutoff frequency to a useful range compared to frame-to-frame filtering. The wall filter increases the flow signal-to-clutter ratio, which may be further increased by using a contrast agent. The resulting B-mode flow image has the advantages of low clutter from stationary or slow-moving tissue or vessel walls, high resolution, high frame rate and flow sensitivity in all directions.

In accordance with one preferred embodiment of the invention, a broadband pulse is transmitted multiple times to a particular transmit focal position. On receive, the fundamental signals are isolated (e.g., using a bandpass filter) and then the isolated fundamental signals are high pass filtered across firings using a wall filter. The passed signals can be used to image blood flow without the injection of contrast agents into the blood.

In accordance with another preferred embodiment of the invention, contrast agents made up of gas-filled microbubbles are injected into the blood to serve as markers for imaging blood flow. A pulse is transmitted multiple times to a particular transmit focal position. Harmonic and subharmonic signals are generated from nonlinear interaction between the transmitted ultrasound pulse and the propagation medium, especially injected contrast agents. On receive, the desired (sub)harmonic signals are isolated (e.g., using a bandpass filter) and then the isolated (sub)harmonic signals are high-pass filtered across firings using a wall filter. As a result of this filtering, (sub)harmonic signals reflected from non-stationary or flow regions along the transmit path can be extracted. The resulting (sub)harmonic flow signals are superimposed on a conventional B-mode vector and displayed. Received energy at the (sub)harmonic frequency which would have contributed to undesirable tissue signal is suppressed by the wall filter.

DETAILED DESCRIPTION OF THE PREFERRED EMBODIMENTS

Figure 1:
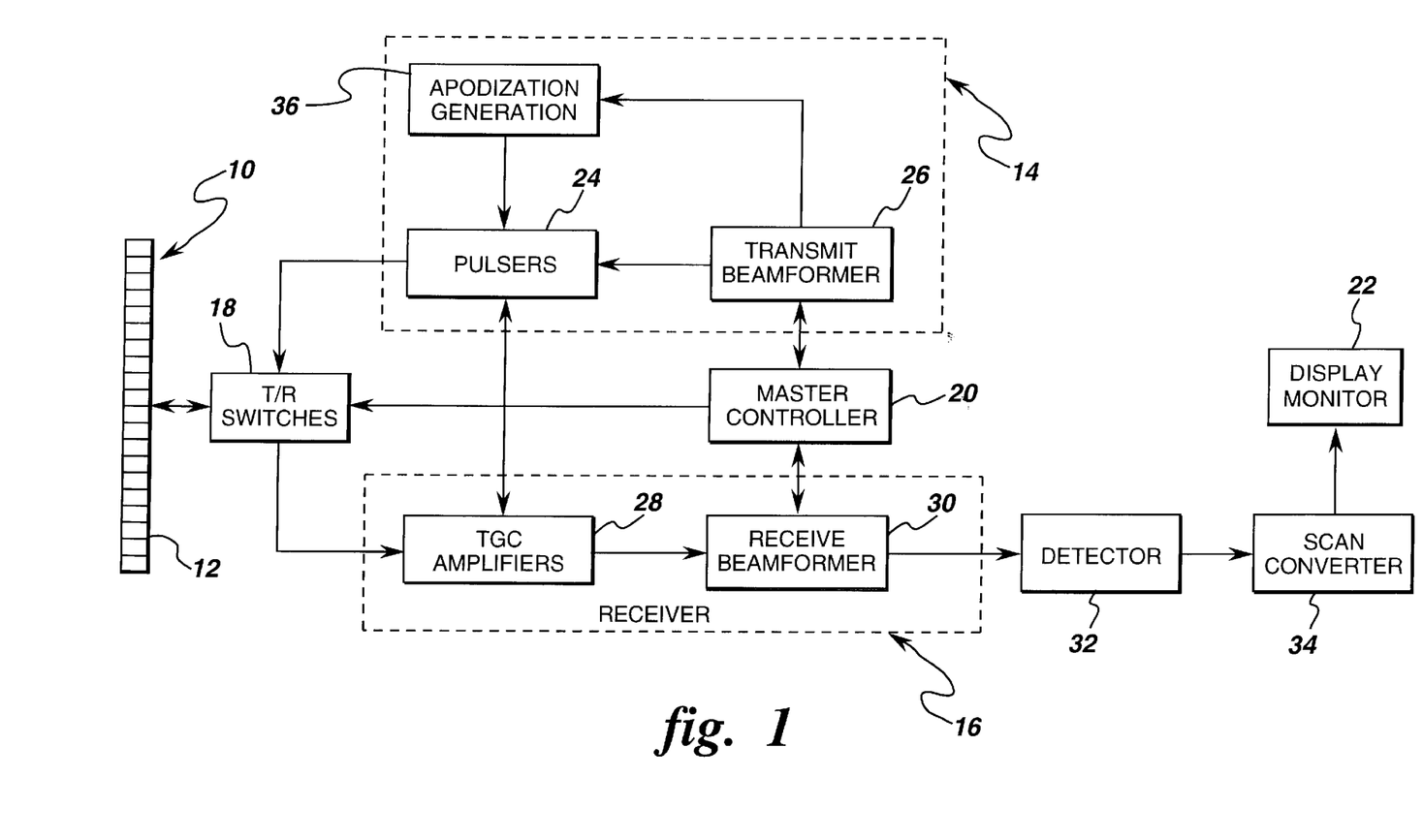
FIG. 1 is a block diagram of a conventional B-mode ultrasound imaging system.

A conventional B-mode ultrasonic imaging system is depicted in FIG. 1. The system comprises a transducer array 10 comprising a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. The T/R switches 18 are typically diodes which protect the receive electronics from the high voltages generated by the transmit electronics. The transmit signal causes the diodes to shut off or limit the signal to the receiver. Transmitter 14 and receiver 16 are operated under control of a master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a display monitor 22.

Under the direction of master controller 20, transmitter 14 drives transducer array 10 such that the ultrasonic energy is transmitted as a directed focused beam. To accomplish this, respective time delays are imparted to a plurality of pulsers 24 by a transmit beamformer 26. Master controller 20 determines the conditions under which the acoustic pulses will be transmitted. With this information, transmit beamformer 26 determines the timing and amplitudes of each of the transmit pulses to be generated by pulsers 24. The amplitudes of each transmit pulse are generated by an apodization generation circuit 36, which may be a highvoltage controller that sets the power supply voltage to each pulser. Pulsers 24 in turn send the transmit pulses to each of elements 12 of transducer array 10 via T/R switches 18, which protect time-gain control (TGC) amplifiers 28 from the high voltages which may exist at the transducer array. Weightings are generated within apodization generation circuit 36, which may comprise a set of digital-to analog converters that take the weighting data from transmit beamformer 26 and apply it to pulsers 24. By appropriately adjusting the transmit focus time delays in a conventional manner and also adjusting the transmit apodization weightings, an ultrasonic beam can be directed and focused to form a transmit beam.

The echo signals produced by each burst of ultrasonic energy reflect from objects located at successive ranges along each transmit beam. The echo signals are sensed separately by each transducer element 12 and a sample of the magnitude of the echo signal at a particular point in time represents the amount of reflection occurring at a specific range. Due to differences in the propagation paths between a reflecting point and each transducer element 12, the echo signals will not be detected simultaneously and their amplitudes will not be equal. Receiver 16 amplifies the separate echo signals via a respective TGC amplifier 28 in each receive channel. The amount of amplification provided by the TGC amplifiers is controlled through a control path (not shown) that is driven by a TGC circuit (not shown), the latter being set by the master controller and hand operation of potentiometers. The amplified echo signals are then fed to a receive beamformer 30. Each receiver channel of the receive beamformer is coupled to a respective one of transducer elements 12 by a respective TGC amplifier 28.

Under the direction of master controller 20, receive beamformer 30 tracks the direction of the transmitted beam.

Receive beamformer 30 imparts the proper time delays and receive apodization weightings to each amplified echo signal and sums them to provide an echo signal which accurately indicates the total ultrasonic energy reflected from a point located at a particular range along one ultrasonic beam. The receive focus time delays are computed in real-time using specialized hardware or are read from a look-up table. The receive channels also have circuitry for filtering the received pulses. The time-delayed receive signals are then summed and supplied to a signal processor or detector 32. Detector 32 converts the summed receive signals to display data. In the B-mode (grey scale), this is the envelope of the signal with some additional processing, such as edge enhancement and logarithmic compression. A scan converter 34 receives the display data from detector 32 and converts the data into the desired image for display. In particular, scan converter 34 converts the acoustic image data from polar coordinate (R-θ) sector format or Cartesian coordinate linear array to appropriately scaled Cartesian coordinate display pixel data at the video rate. These scan-converted acoustic data are then provided for display on display monitor 22, which images the time-varying amplitude of the signal envelope as a grey scale. A respective scan line is displayed for each transmit beam.

Figure 2:
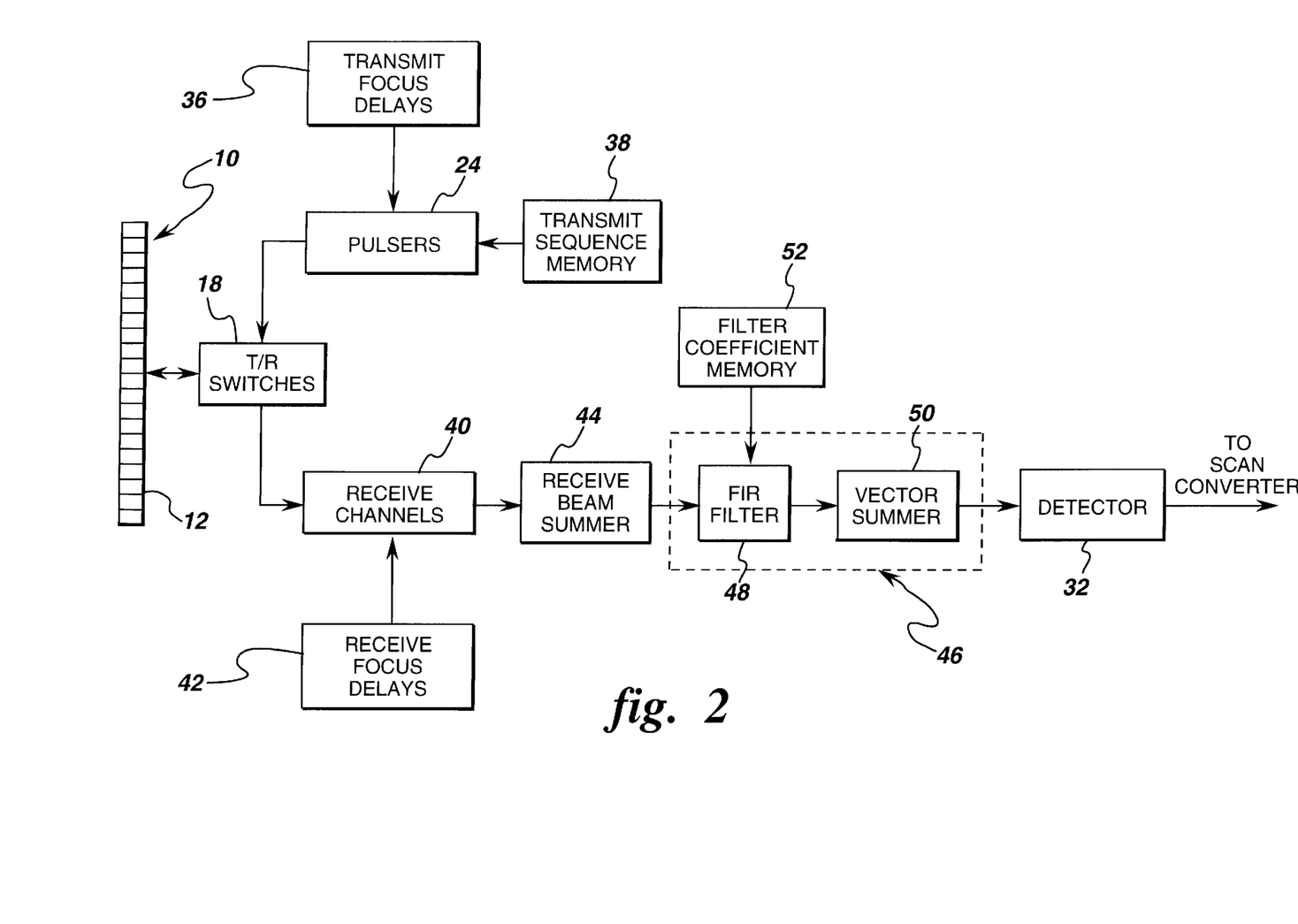
FIG. 2 is a block diagram of an ultrasound imaging system in accordance with a preferred embodiment of the invention.

FIG. 2 shows an ultrasound B-mode flow imaging system in accordance with the present invention for use in medical diagnostics. In this system each transducer element in the transmit aperture is pulsed N times using the same waveform by supplying transmit sequence 38 to each pulser N times. Pulsers 24 drive elements 12 of transducer array 10 such that the ultrasonic energy produced is directed or steered in a beam for each transmit firing. To accomplish this, transmit focus time delays 36 are imparted to the respective pulsed waveforms produced by the pulsers in response to transmit sequence 38. By appropriately adjusting the transmit focus time delays in a conventional manner, the ultrasonic beam can be focused at a desired transmit focal position.

For each transmit, the echo signals from transducer elements 12 are fed to respective receive channels 40 of the receive beamformer. Under the direction of master controller 20 (FIG. 1), the receive beamformer tracks the direction of the transmitted beam. The receive beamformer imparts the proper receive focus time delays 42 to the received echo signal and sums them to provide an echo signal which accurately indicates the total ultrasonic energy reflected from a particular position along a transmit beam. The time-delayed receive signals are summed in a receive summer 44 for each of the N transmit firings focused at a particular transmit focal position. The summed receive signals for successive transmit firings are provided to a wall filter 46, which filters across the N transmit firings and then supplies a filtered signal to detector 32. Detector 32 forms the envelope of the firing-to-firing filtered signal. After post-processing (including edge enhancement and logarithmic compression) and scan conversion, a scan line is displayed on display monitor 22 (FIG. 1). This procedure is repeated so that a respective scan line is displayed for each transmit focal position (in the case of one transmit focal position for each beam angle) or for each vector (in the case of multiple transmit focal positions for each beam angle).

In accordance with the preferred embodiments of the invention, filter 46 comprises an FIR filter 48 having an input coupled to the output of receive summer 44; and a vector summer 50 having an input coupled to FIR filter 48 and an output coupled to detector 32. The FIR filter has M filter taps for receipt of a respective set of M filter coefficients for each transmit firing. The filter coefficients for the n-th transmit firing are $a_n c_0, a_n c_1, \ldots, a_n c_{M-1}$, where $a_n$ is the scalar weighting for the n-th transmit firing, n=0, 1, ..., N−1, and $c_0, c_1, \ldots, c_{M-1}$ is a set of filter coefficients which are selected so that FIR filter 48 passes a major fraction of the desired fundamental frequencies or desired (sub) harmonic frequencies in the receive signal. The scalar weightings $a_0, a_1, \ldots, a_{N-1}$ form a "wall" filter in slow time which selectively passes signals from reflectors moving at a velocity greater than a predetermined threshold. The filter coefficients $a_n c_0, a_n c_1, \ldots, a_n c_{M-1}$ are supplied to the filter for each transmit firing by the master controller from a filter coefficient memory 52. For example, for the first transmit firing, the set of filter coefficients $a_0 c_0, a_0 c_1, \ldots, a_0 c_{M-1}$ is supplied to the FIR filter; for the second transmit firing, the set of filter coefficients $a_1 c_0, a_1 c_1, \ldots, a_1 c_{M-1}$ is supplied to the FIR filter; and so forth. The filter coefficients are programmable depending upon the diagnostic application. Different sets of filter coefficients can be stored in look-up tables inside the master controller memory and the desired set of coefficients can be selectable by the system operator. For applications where the number of transmit firings N=2, pairs of sets of filter coefficients are stored in memory, one set of filter coefficients of a selected pair being transferred to the FIR filter before the first transmit firing and the other set of filter coefficients of the selected pair being transferred to the FIR filter after the first transmit firing and before the second transmit firing. Similarly, for applications where the number of transmit firings N=3, two or three sets of filter coefficients are stored in memory for use in filtering the receive signals resulting from the first through third firings. A similar procedure is enacted for applications where the number of transmit firings N>3. The successive FIR filter output signals for the N transmit firings are accumulated in a vector summer 50. The output signal of the vector summer then undergoes conventional B-mode processing, followed by scan conversion and display.

In accordance with one preferred embodiment of the invention, a sequence of identical N broadband pulses, centered at a fundamental frequency, are transmitted by the transducer array to a particular transmit focal position. On receive, a bandpass filter centered at the fundamental frequency substantially isolates the desired fundamental component. Subsequently a wall filter extracts the fundamental flow signal over the N transmits. A fundamental flow filter such as shown in FIG. 2 may comprise two stages: the first stage 54 extracts a major fraction of the fundamental component and the second stage 56 substantially suppresses the stationary fundamental components with a high-pass wall filter.

Both stages of a fundamental flow filter are embodied in the FIR filter 48 shown in FIG. 2. A set of filter coefficients $c_0, c_1, \ldots, c_{M-1}$ are selected so that the M-tap FIR filter 48 passes a major fraction of the fundamental frequencies in the receive signal. In addition, the wall filter weightings 56 which are $a_0, a_1, \ldots, a_{N-1}$ are selected so that the fundamental signals are high-pass filtered across firings when the respective output signals of the FIR filter for a given transmit focal position are summed. The summed signal is then B-mode processed in conventional fashion, i.e., envelope detection, logarithmic compression, etc.

Figure 3:
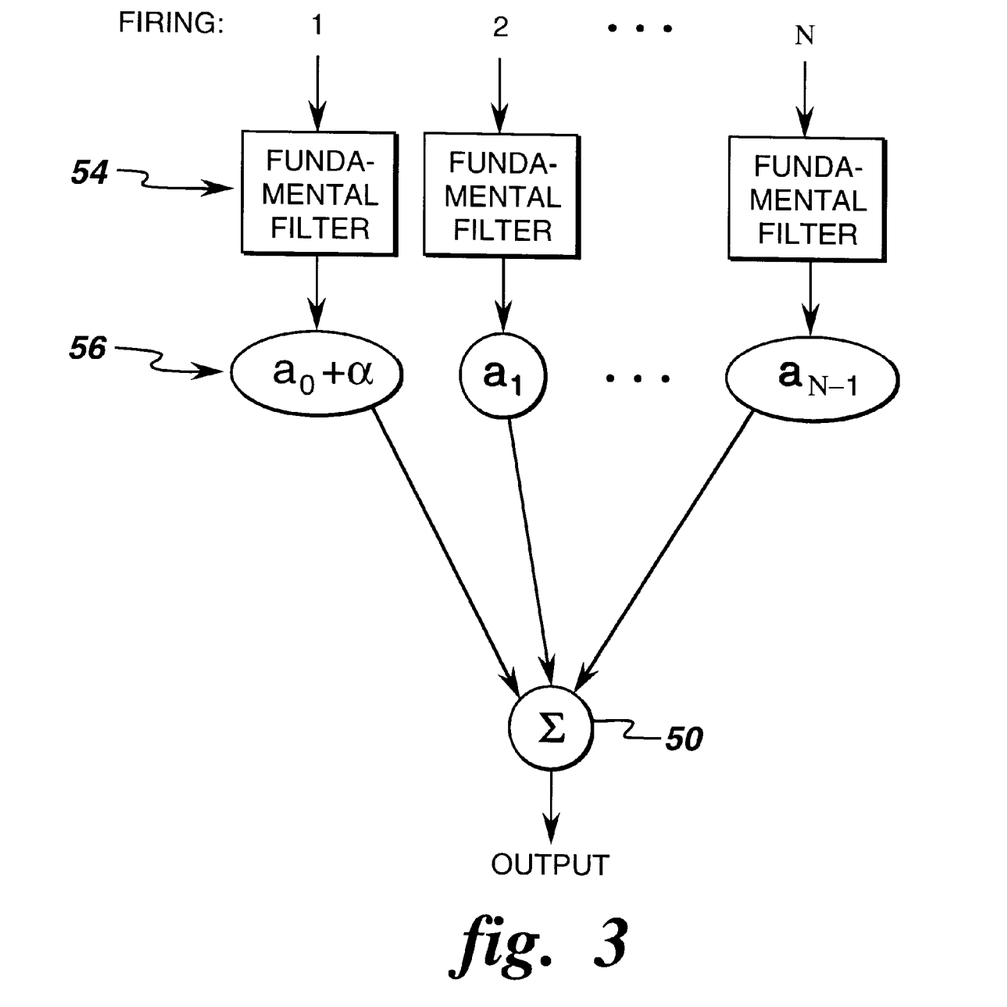
FIG. 3 is a flowchart showing B-mode (fundamental) flow filtering with B-mode feed-through in accordance with one preferred embodiment of the invention.

In accordance with the foregoing preferred embodiment of the invention, the B-mode flow image is superimposed on a conventional B-mode image. This allows the diagnostician to observe the flow of blood relative to known anatomical landmarks during medical diagnosis. This B-mode image feed-through is achieved by perturbing one of the wall filter weightings. For example, the weighting $a_0$ for the first transmit firing can be perturbed by an amount α, as shown in the flow chart of FIG. 3. The B-mode feed-through allows the flow image to be superimposed on top of a conventional B-mode image for display. Alternatively, the flow image may be superimposed in color on top of a conventional B-mode image for display.

Figure 4:
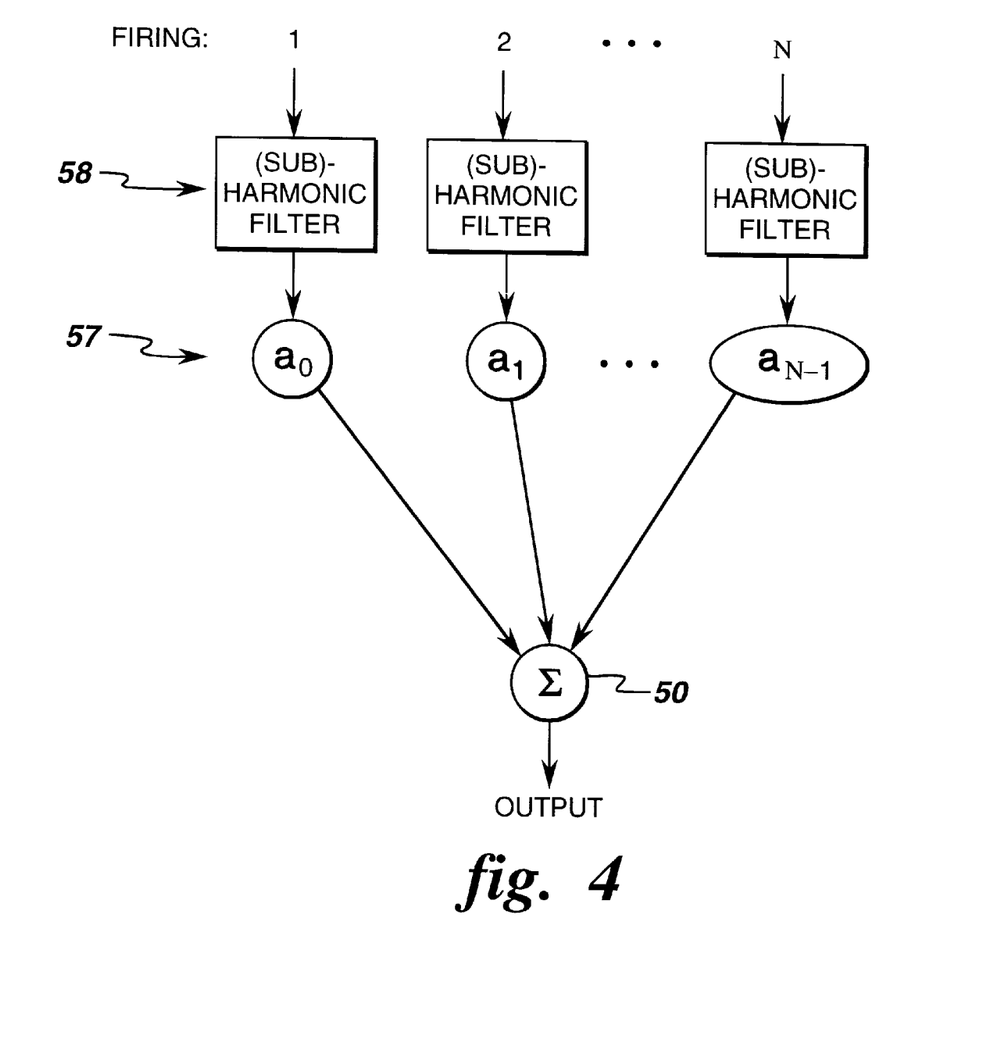
FIG. 4 is a flowchart showing (sub)harmonic flow filtering in accordance with another preferred embodiment of the invention.

In accordance with another preferred embodiment of the invention, contrast agents made up of gas-filled microbubbles are injected into the blood to serve as markers for imaging blood flow. Again multiple firings of identical pulses are transmitted to a particular transmit focal position in succession. In particular, N pulses centered at frequency $f_0$ are transmitted to each transmit focal position. On receive, a bandpass filter centered at a (sub)harmonic frequency substantially isolates the desired (sub)harmonic component. Subsequently a wall filter extracts the (sub)harmonic flow signal over the N transmits. A (sub)harmonic flow filter may comprise two stages: a first stage 58 that extracts a major fraction of the (sub)harmonic component and a second stage 57 that substantially suppresses the stationary (sub) harmonic components with a high-pass wall filter. In accordance with this (sub)harmonic preferred embodiment, both filter stages are embodied in FIR filter 48 shown in FIG. 2. For example, a set of (sub)harmonic filter coefficients $c_0, c_1, \ldots, c_{M-1}$ are selected so that the M-tap FIR filter 48 passes a major fraction of the desired harmonic or subharmonic frequencies in the receive signal. If the transmitted center frequency is at $f_0$, then tissue/contrast nonlinearities will generate harmonics at $kf_0$, where k is an integer greater than or equal to 2. Also, subharmonics at frequencies $f_0/k$ may be generated by contrast bubble destruction. For the case shown in FIG. 4, the output signal of summer 50 is comprised of substantially only harmonic (or subharmonic) signals changing with time (i.e., moving reflectors). In a preferred embodiment, the second harmonic signal is imaged. This is accomplished using a conventional B-mode transmit sequence of identical pulses, except that the transmit signal needs to be more narrowband than usual to allow the second harmonic to also fit within the transducer bandwidth.

Figure 5:
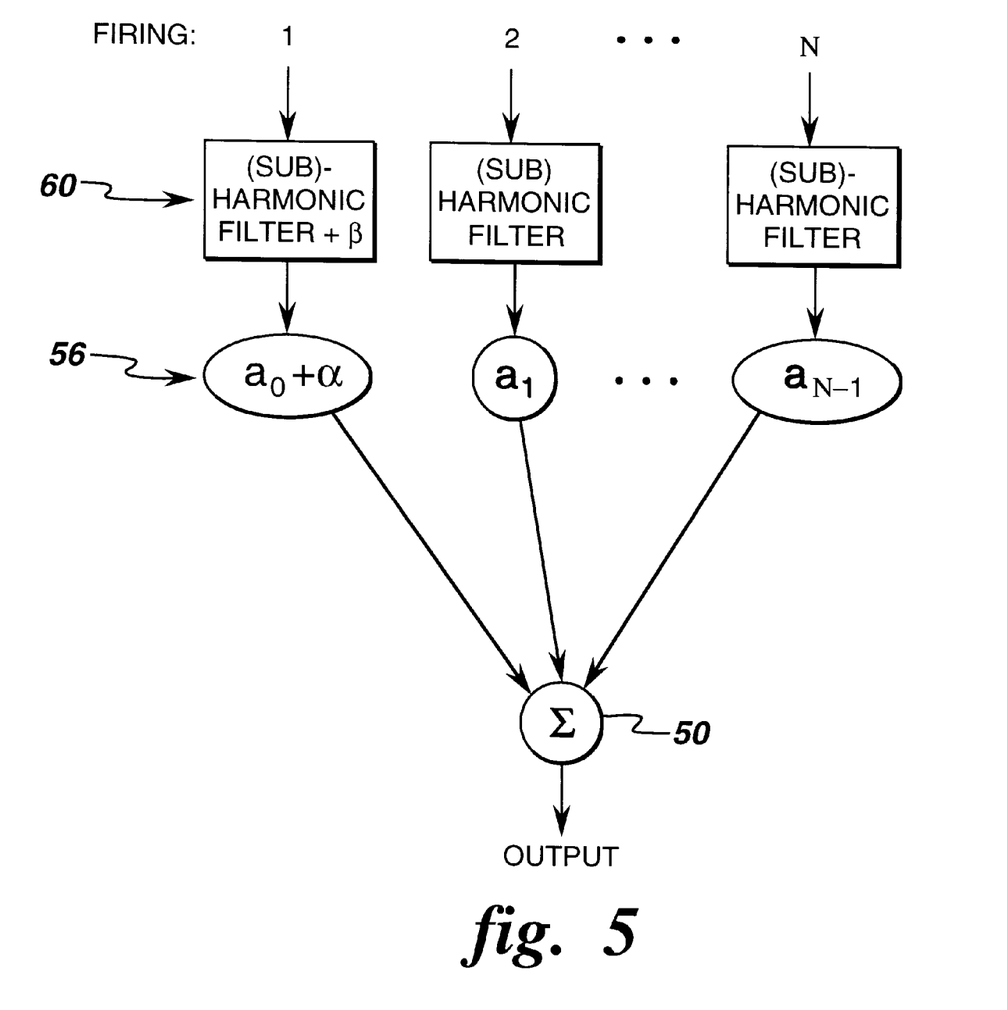
FIG. 5 is a flowchart showing (sub)harmonic flow filtering with B-mode and harmonic feed-through in accordance with a further preferred embodiment of the invention.

In accordance with further variations of the (sub) harmonic imaging embodiment, harmonic feed-through with or without B-mode feed-through can be provided. FIG. 5 depicts feed-through of both the harmonic and B-mode (non-flow) image. The B-mode image feed-through is achieved by perturbing each of the coefficients $c_0, c_1, \ldots, c_{M-1}$ of the (sub)harmonic filter stage 60 or portion of FIR filter 48 during one of the transmit firings by an amount β, causing the filter to pass fundamental B-mode signals. The B-mode feed-through allows some conventional B-mode image to pass such that the displayed image is a superposition of a harmonic flow image on a conventional B-mode image, the latter serving to provide familiar and recognizable image features to the sonographer.

The harmonic feed-through does the same thing, except that it lets through a harmonic image instead of or in addition to a B-mode (fundamental) image. The harmonic images have been demonstrated to perform better than regular B-mode for certain difficult-to-image patients. The harmonic feed-through is achieved by perturbing one of the wall filter weightings $a_0, a_1, \ldots, a_{N-1}$. For example, the weighting $a_0$ for the first transmit firing can be perturbed 56 by an amount α, as shown in FIG. 5. Although FIG. 5 depicts harmonic and B-mode feed-through during the same transmit firing, it will be appreciated that the harmonic and B-mode feed-throughs can be accomplished on different firings.

Figure 6:
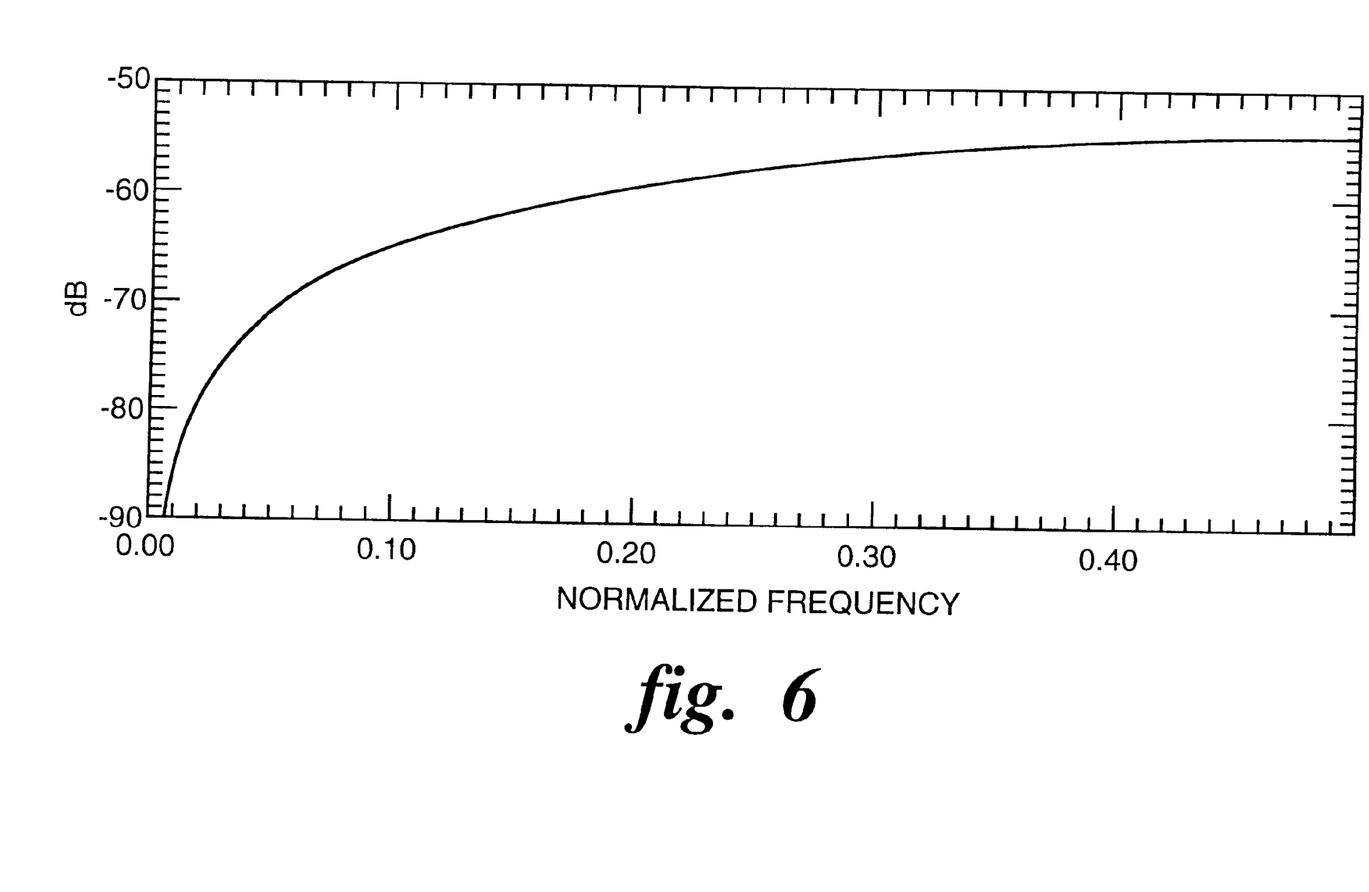
FIG. 6 is a graph showing the wall filter output signal as a function of slow-time normalized frequency for the case where the number of transmit firings N=2 and the wall filter weightings are [1, −1]. (For the wall filters disclosed herein, the signal generally falls in the 0 to 0.2 normalized frequency range given an appropriate pulse repetition interval.)
Figure 7:
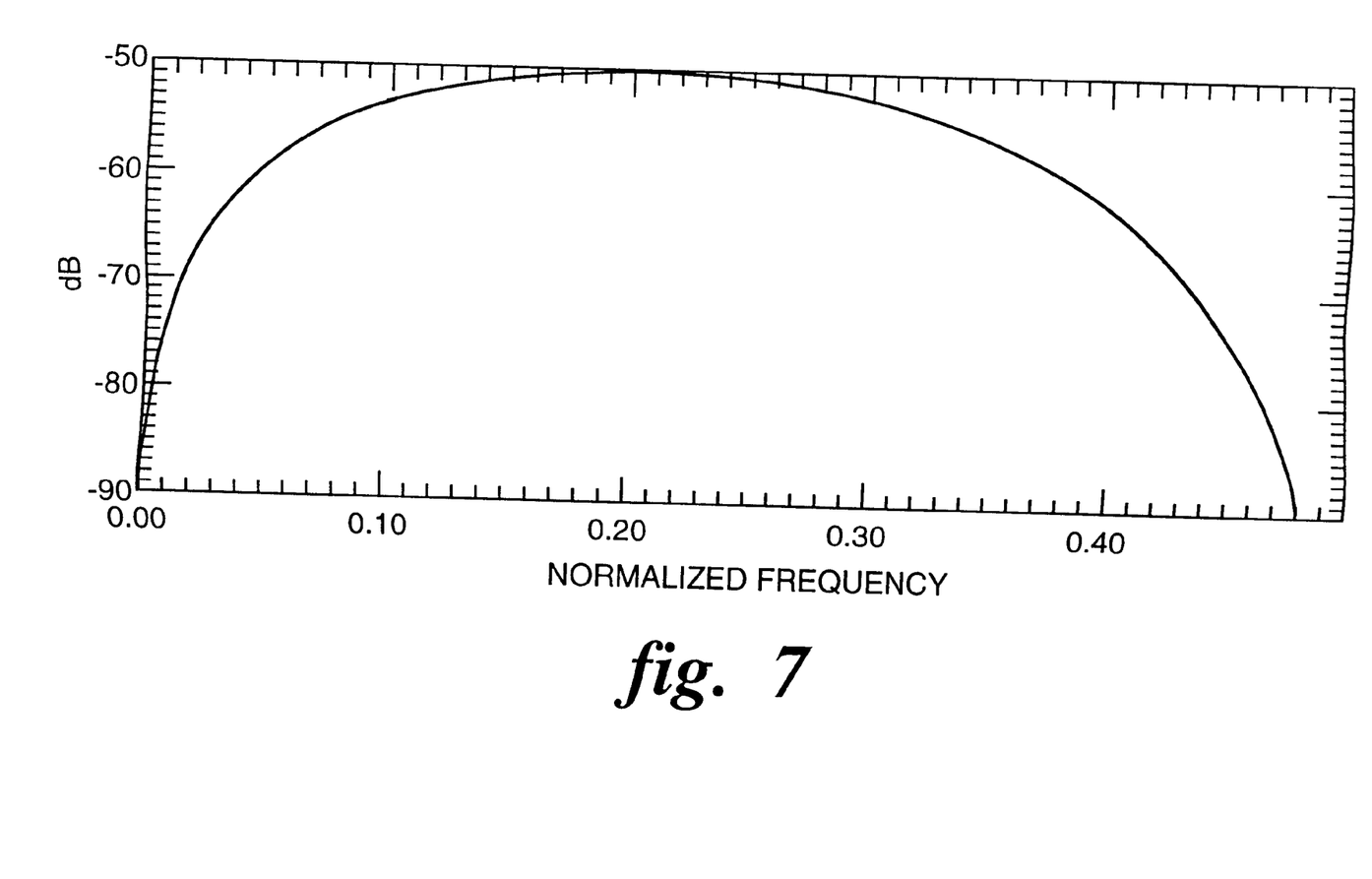
FIG. 7 is a graph showing the wall filter output signal as a function of slow-time normalized frequency for the case where the number of transmit firings N=4 and the wall filter weightings are [1, 1, −1, −1].
Figure 8:
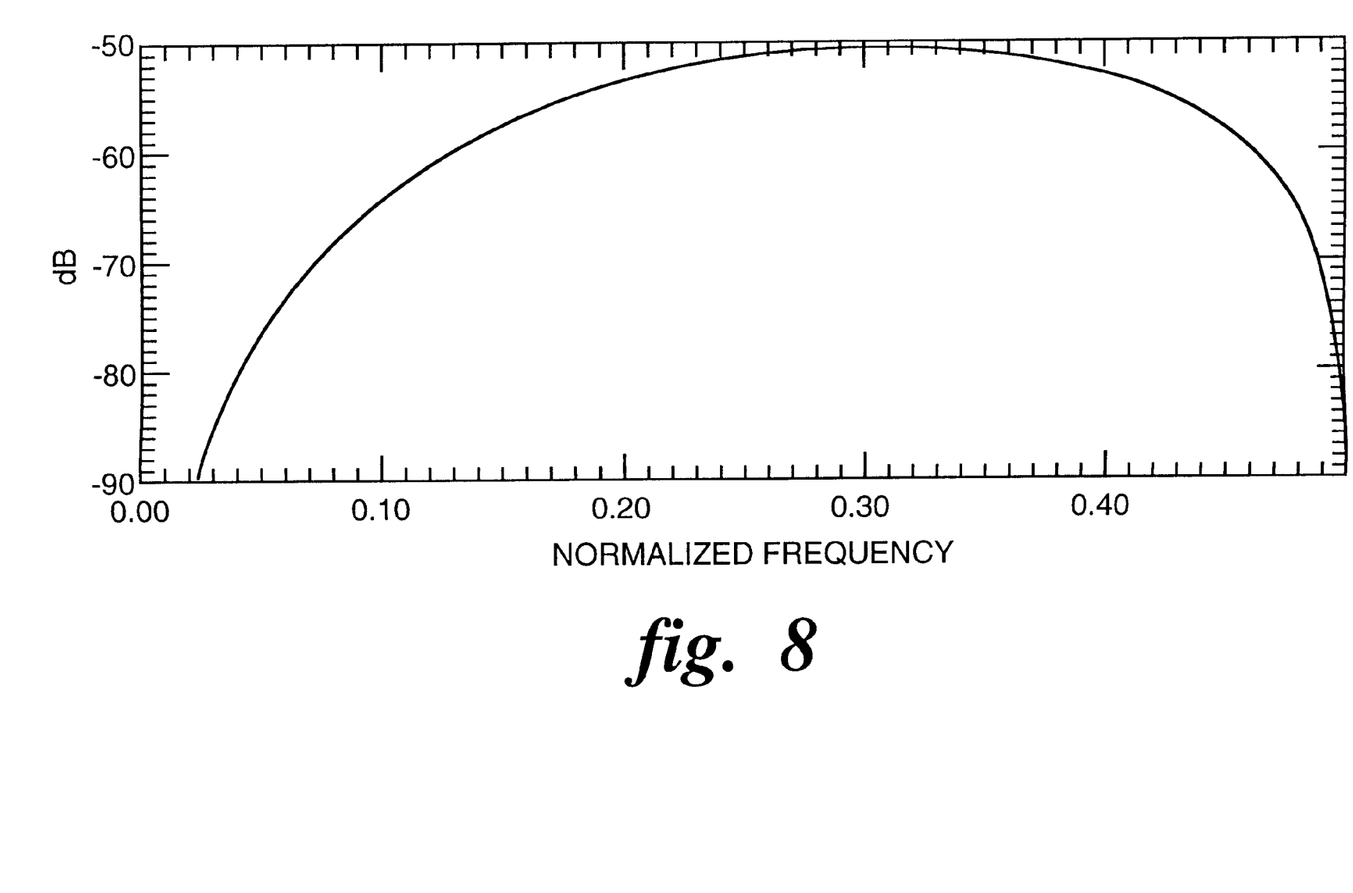
FIG. 8 is a graph showing the wall filter output signal as a function of slow-time normalized frequency for the case where the number of transmit firings N=4 and the wall filter weightings are [1, −1, −1, 1].

The B-mode flow imaging system using bandpass filtering and wall filtering was simulated for N=2 transmits using wall filter weightings $a_0=1$ and $a_1=-1$. The wall filter response as a function of normalized frequency for a wall filter having weightings [1, –1] is depicted in FIG. 6. The system was also simulated for N=4 transmits using weightings $a_0=1$, $a_1=1$, $a_2=-1$, $a_3=-1$ (see FIG. 7) and using weightings $a_0=1$, $a_1=-1$, $a_2=-1$, $a_3=1$ (see FIG. 8). The wall filters represented by FIGS. 6–8, when coupled with fundamental or (sub)harmonic bandpass filtering, serve to highpass filter the fundamental or (sub)harmonic signals. The foregoing wall filter weightings are chosen to reject low frequencies which correspond to relatively slow motion. This allows the non-stationary components of the fundamental or (sub)harmonic signals to be visualized. This technique can be used to image blood flow in B mode with or without use of contrast agents. Alternatively, the system may employ N=3 transmits and the following weightings: $a_0=-0.5$, $a_1=1$, $a_2=-0.5$.

The time interval between each of the N transmits per focal position is user controllable to determine the wall filter cut-off frequency. A longer interval between each of the N transmits to a particular focal position results in a lower cutoff frequency with higher sensitivity to low velocity flow.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A system for imaging ultrasound scatterers, comprising:

an ultrasound transducer array comprising a plurality of transducer elements;

pulsing means coupled to said transducer array for pulsing selected ones of said transducer elements which form a transmit aperture with a first pulse sequence during a first transmit firing and with a second pulse sequence during a second transmit firing, said first and second pulse sequences being identical;

transmit beamforming means coupled to said pulsing means for forming first and second beams during said first and second transmit firings respectively, said first and second beams being focused at substantially the same transmit focal position;

receive beamforming means coupled to said transducer array for forming a first beamsummed receive signal from a first set of receive signals from other selected ones of said transducer elements which form a receive aperture subsequent to said first transmit firing and for forming a second beamsummed receive signal from a second set of receive signals from said other selected ones of said transducer elements which form said receive aperture subsequent to said second transmit firing;

means for providing a first set of filter coefficients to said first beamsummed receive signal and a second set of filter coefficients to said second beamsummed receive signal, said first set of filter coefficients being different from said second set of filter coefficients;

a filter having an input coupled to an output of said receive beamforming means, a plurality of M filter taps coupled to receive said first and second sets of filter coefficients from said means for providing said first and second sets of said filter coefficients, and an output for supplying a first filtered signal in dependence on said first beamsummed receive signal and said first set of filter coefficients and for supplying a second filtered signal in dependence on said second beamsummed receive signal and said second set of filter coefficients;

a vector summer coupled to the output of said filter for adding at least said first and second filtered signals to form a wall-filtered signal;

means for B-mode processing said wall-filtered signal to form a B-mode flow image signal; and means for displaying an image which is a function of said B-mode flow image signal.

2. The system of claim 1 wherein said first set of filter coefficients is derived by multiplying a predetermined set of filter coefficients by a first scalar weighting factor $a_0$ and said second set of filter coefficients is derived by multiplying said predetermined set of filter coefficients by a second scalar weighting factor $a_1$.

3. The system of claim 2 wherein said first scalar weighting factor $a_0$ is perturbed by an amount $\alpha$ to achieve B-mode feed-through.

4. The system of claim 2 wherein said predetermined set of filter coefficients are selected so that said filtering means substantially pass a fundamental signal and substantially reject a (sub)harmonic signal.

5. The system of claim 2 wherein said predetermined set of filter coefficients are selected so that said filtering means substantially pass a (sub)harmonic signal and substantially reject a fundamental signal.

6. The system of claim 2 wherein $a_0 = -a_1$.

7. A method for imaging ultrasound scatterers, comprising the steps of:

driving a first set of transducer elements forming a transmit aperture in a transducer array with a first pulse sequence to form a first transmit beam during a first transmit firing;

receiving a first set of echo signals from a second set of transducer elements forming a receive aperture in the transducer array subsequent to said first transmit firing;

forming a first beamsummed receive signal from said first set of echo signals;

driving said first set of transducer elements with a second pulse sequence to form a second transmit beam during a second transmit firing, said first and second pulse sequences being identical, said first and second transmit beams being focused at substantially the same transmit focal position;

receiving a second set of echo signals from said second set of transducer elements subsequent to said second transmit firing;

forming a second beamsummed receive signal from said second set of echo signals;

forming a first filtered signal in dependence on said first beamsummed receive signal and a first set of filter coefficients;

forming a second filtered signal in dependence on said second beamsummed receive signal and a second set of filter coefficients, said first set of filter coefficients being different from said second set of filter coefficients;

adding said first and second filtered signals to form a wall-filtered signal;

B-mode processing said wall-filtered signal to form a B-mode flow image signal; and displaying an image which is a function of said B-mode flow image signal.

8. The method of claim 7 wherein said first set of filter coefficients is derived by multiplying a predetermined set of filter coefficients by a first scalar weighting factor $a_0$ and said second set of filter coefficients is derived by multiplying said predetermined set of filter coefficients by a second scalar weighting factor $a_1$.

9. The method of claim 8 wherein said first scalar weighting factor $a_0$ is perturbed by an amount $\alpha$ to achieve B-mode feed-through.

10. The method of claim 8 wherein said predetermined set of filter coefficients are selected so that said filtering means substantially pass a fundamental signal and substantially reject a (sub)harmonic signal.

11. The method of claim 8 wherein said predetermined set of filter coefficients are selected so that said filtering means substantially pass a (sub)harmonic signal and substantially reject a fundamental signal.

12. The method of claim 8 wherein $a_0 = -a_1$.

13. A system for imaging ultrasound scatterers, comprising:

a transducer array including a plurality of ultrasound transducer elements;

pulsing means coupled to said transducer array for pulsing selected ones of said transducer elements which form a transmit aperture with a first pulse sequence during a first transmit firing and with a second pulse sequence during a second transmit firing, said first and second pulse sequences being identical;

transmit beamforming means coupled to said pulsing means for forming first and second beams during said first and second transmit firings respectively, said first and second beams being focused at substantially the same transmit focal position;

receive beamforming means coupled to said transducer array for forming a first beamsummed receive signal from a first set of receive signals from other selected ones of said transducer elements which form a receive aperture subsequent to said first transmit firing and for forming a second beamsummed receive signal from a second set of receive signals from said other selected ones of said transducer elements which form said receive aperture subsequent to said second transmit firing;

isolating means for substantially isolating components having frequencies in a predetermined range, said isolating means being adapted to form a first filtered signal by applying a first set of coefficients to said first beamsummed receive signal and being adapted to form a second filtered signal by applying a second set of coefficients to said second beamsummed receive signal, said first set of filter coefficients being different from said second set of filter coefficients;

a vector summer coupled to an output of said isolating means for adding at least said first and second filtered signals to form a wall-filtered signal;

means for B-mode processing said wall-filtered signal to form a B-mode flow image signal; and means for displaying an image which is a function of said B-mode flow image signal.

14. The system of claim 13 wherein said isolating means are adapted to substantially pass a fundamental signal and substantially reject a (sub)harmonic signal.

15. The system of claim 13 wherein said isolating means are adapted to substantially pass a (sub)harmonic signal and substantially reject a fundamental signal.

16. A method for imaging ultrasound scatterers in a flowing fluid medium, comprising the steps of:

injecting a contrast agent into the flowing fluid medium;

driving a first set of transducer elements that form a transmit aperture in a transducer array with a first pulse sequence to produce a first transmit beam during a first transmit firing;

receiving a first set of echo signals from a second set of transducer elements that form a receive aperture in the transducer array subsequent to said first transmit firing;

forming a first beamsummed receive signal from said first set of echo signals;

driving said first set of transducer elements with a second pulse sequence to form a second transmit beam during a second transmit firing, said first and second pulse sequences being identical, and said first and second transmit beams having substantially the same transmit focal position;

receiving a second set of echo signals from said second set of transducer elements subsequent to said second transmit firing;

forming a second beamsummed receive signal from said second set of echo signals;

substantially isolating a first (sub)harmonic signal contained in said first beamsummed receive signal and a second (sub)harmonic signal contained in said second beamsummed receive signal;

summing at least said first and second (sub)harmonic signals to form a wall-filtered signal;

B-mode processing said wall-filtered signal to form a B-mode flow image signal; and displaying an image which is a function of said B-mode flow image signal.

17. A system for imaging ultrasound scatterers, comprising:

an ultrasound transducer array comprising a plurality of transducer elements;

pulsing means coupled to said transducer array for pulsing selected ones of said transducer elements which form a transmit aperture with a first pulse sequence during a first transmit firing and with a second sequence during a second transmit firing, said first and second pulse sequences being identical;

transmit beamforming means coupled to said pulsing means for forming first and second beams during said first and second transmit firings respectively, said first and second beams being focused at substantially the same transmit focal position;

receive beamforming means coupled to said transducer array for forming a first beamsummed receive signal from a first set of receive signals from other selected ones of said transducer elements which form a receive aperture subsequent to said first transmit firing and for forming a second beamsummed receive signal from a second set of receive signals from said other selected ones of said transducer elements which form said receive aperture subsequent to said second transmit firing;

means for providing a first set of filter coefficients to said first beamsummed receive signal and a second set of filter coefficients to said second beamsummed receive signal, said first set of filter coefficient being different from said second set of filter coefficients;

a wall filter for producing a weighted sum of said first and second beamsummed receive signals to form a wall filtered signal with a selectable ratio of tissue to flow signal determined by the wall filter scalar weighting factors;

amplitude detecting the wall-filtered signal to form a B-mode flow image signal; and displaying an image as a function of said B-mode flow image signal.

18. The system of claim 17 wherein said first set of filter coefficients is derived by multiplying a predetermined set of filter coefficients by a first scalar weighting factor $a_0$ and said second set of filter coefficients is derived by multiplying said predetermined set of filter coefficients by a second scalar weighting factor $a_1$.

19. The system of claim 18 wherein said first scalar weighting factor $a_0$ is perturbed by an amount $\alpha$ to achieve B-mode feed-through.

20. The system of claim 18 wherein $a_0=-a_1$.

21. A method for imaging ultrasound scatterers, comprising the steps of:

driving a first set of transducer elements forming a transmit aperture in a transducer array with a first pulse sequence to form a first transmit beam during a first transmit firing;

receiving a first set of echo signals from a second set of transducer elements forming a receive aperture in the transducer array subsequent to said first transmit firing;

forming a first beamsummed receive signal from said first set of echo signals;

driving said first set of transducer element with a second pulse sequence to form a second transmit beam during a second transmit firing, said first and second pulse sequences being identical, said first and second transmit beams being focused at substantially the same transmit focal position;

receiving a second set of echo signals from said second set of transducer elements subsequent to said second transmit firing;

forming a second beamsummed receive signal from said second set of echo signals;

forming a first filtered signal in dependence on said first beamsummed receive signal and a first set of filter coefficients;

forming a second filtered signal in dependence on said second beamsummed receive signal and a second set of filter coefficients, said first set of filter coefficients being different from said second set of filter coefficients;

adding said first and second filtered signals to form a wall-filtered signal corresponding to a weighted sum of said first and second beamsummed receive signals, said wall-filtered signal having an adjustable ratio of tissue to flow signal as determined by wall filter scalar weighting factors;

B-mode processing said wall-filtered signal to form a B-mode flow image signal with a selectable ratio of tissue to flow signal as determined by the wall filter scalar weighting factors; and displaying an image which is a function solely of said B-mode flow image signal.

22. The method of claim 21 wherein said first set of filter coefficients is derived by multiplying a predetermined set of filter coefficients by a first scalar weighting factor $a_0$ and said second set of filter coefficients is derived by multiplying said predetermined set of filter coefficients by a second scalar weighting factor $a_1$.

23. The method of claim 22 wherein said first scalar weighting factor $a_0$ is perturbed by an amount $\alpha$ to achieve B-mode feed-through.

* * * * *